United States Patent
Knofe et al.

(10) Patent No.: US 10,902,305 B2
(45) Date of Patent: Jan. 26, 2021

(54) ELECTRONIC IDENTIFICATION DEVICE

(71) Applicant: Siemens Aktiengesellschaft, Munich (DE)

(72) Inventors: Rüdiger Knofe, Teltow (DE); Stefan Nerreter, Heidesee ot Blossin (DE); Michael Niedermayer, Glienicke (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 31 days.

(21) Appl. No.: 16/301,693

(22) PCT Filed: May 12, 2017

(86) PCT No.: PCT/EP2017/061438
§ 371 (c)(1),
(2) Date: Nov. 14, 2018

(87) PCT Pub. No.: WO2017/198558
PCT Pub. Date: Nov. 23, 2017

(65) Prior Publication Data
US 2019/0286958 A1    Sep. 19, 2019

(30) Foreign Application Priority Data
May 18, 2016    (DE) .......... 10 2016 208 497

(51) Int. Cl.
*G06K 19/06*    (2006.01)
*G06K 19/07*    (2006.01)
(Continued)

(52) U.S. Cl.
CPC .......... *G06K 19/0707* (2013.01); *G06K 7/10* (2013.01); *G06K 19/025* (2013.01); *G06K 19/0704* (2013.01); *G06K 19/0713* (2013.01)

(58) Field of Classification Search
CPC ............. G06K 19/025; G06K 19/0704; G06K 19/0707; G06K 19/0713; G06K 7/10
See application file for complete search history.

(56) References Cited

U.S. PATENT DOCUMENTS

| 4,841,128 A | * | 6/1989 | Grottrup | .......... G06K 19/07749 235/491 |
| 5,193,201 A |   | 3/1993 | Tymes    | .......... 708/191 |

(Continued)

FOREIGN PATENT DOCUMENTS

| DE | 10 2009 056 949 A1 | 6/2011  | ............. G01D 21/00 |
| WO | 2010/134154 A1     | 11/2012 | ............. G06K 17/00 |

(Continued)

OTHER PUBLICATIONS

Japanese Office Action, Application No. 2018560527, 7 pages, dated Feb. 18, 2020.

(Continued)

*Primary Examiner* — Thien M Le
(74) *Attorney, Agent, or Firm* — Slayden Grubert Beard PLLC

(57) ABSTRACT

Various embodiments may include an identification device comprising: a data memory storing a piece of information containing an identification; a processor generating a signal indicating the piece of information; an optical-to-electrical energy converter supplying power for the processor and converting electromagnetic radiation from the surroundings into an electric current feeding the processor via a power connection; an output device with a data connection to the processor for transmitting the signal; and an executable program stored in the processor for reading an input signal transmitted via the power connection and superimposed on the electrical current.

9 Claims, 2 Drawing Sheets

(51) Int. Cl.
*G06K 7/10* (2006.01)
*G06K 19/02* (2006.01)

(56) References Cited

U.S. PATENT DOCUMENTS

| | | | | |
|---|---|---|---|---|
| 5,354,979 | A * | 10/1994 | Adelson | G06K 7/0008 235/462.15 |
| 5,576,529 | A * | 11/1996 | Koenck | G06K 7/10574 235/462.47 |
| 7,061,395 | B1 * | 6/2006 | Bromer | B60R 25/00 235/472.01 |
| 2007/0007353 | A1 * | 1/2007 | Danielson | G06K 7/10881 235/462.46 |
| 2013/0329526 | A1 * | 12/2013 | Rakib | H02J 3/385 367/197 |
| 2014/0239068 | A1 * | 8/2014 | Park | G06Q 20/341 235/449 |
| 2015/0083923 | A1 * | 3/2015 | Stanton | G01T 1/20 250/367 |
| 2015/0130281 | A1 * | 5/2015 | Sabripour | H02J 3/32 307/66 |
| 2015/0262194 | A1 | 9/2015 | Dunlop et al. | 705/318 |
| 2015/0317503 | A1 | 11/2015 | Powell et al. | 235/455 |
| 2017/0116441 | A1 | 4/2017 | Xu et al. | 398/108 |
| 2018/0181850 | A1 * | 6/2018 | Powell | G06K 19/06037 |
| 2018/0227735 | A1 * | 8/2018 | Gold | H04W 4/023 |
| 2018/0289114 | A1 * | 10/2018 | Wheeler | G06F 1/163 |

FOREIGN PATENT DOCUMENTS

| | | | | |
|---|---|---|---|---|
| WO | 2015/176426 | A1 | 11/2015 | G06K 19/07 |
| WO | 2015/176478 | A1 | 11/2015 | G06K 7/10 |
| WO | 2017/198558 | A1 | 11/2017 | G06K 19/07 |

OTHER PUBLICATIONS

International Search Report and Written Opinion, Application No. PCT/EP2017/061438, 18 pages, dated Aug. 16, 2017.
German Office Action, Application No. 102016208497.6, 5 pages, dated Nov. 27, 2020.

* cited by examiner

ELECTRONIC IDENTIFICATION DEVICE

CROSS-REFERENCE TO RELATED APPLICATIONS

This application is a U.S. National Stage Application of International Application No. PCT/EP2017/061438 filed May 12, 2017, which designates the United States of America, and claims priority to DE Application No. 10 2016 208 497.6 filed May 18, 2016, the contents of which are hereby incorporated by reference in their entirety.

TECHNICAL FIELD

The present disclosure relates to electronic identification. Various embodiments may include a device used for identifying products.

BACKGROUND

An identification always contains information, for example, about a product. This information may be stored in the identification device. In the simplest case, this may be ensured, for example, via an adhesive label comprising a QR code. However, the information may also be stored electronically. This is described in WO 2015/176478 A1 and in WO 2015/176426 A1. Here, electronic identification devices are used, which can function autonomously because they comprise a solar cell acting as a power supply. In addition, there is an optical receiver for an input signal which, for example, may be a control signal for programming the identification device. Furthermore, an optical output device is provided for outputting an output signal carrying said aforementioned piece of information. The output device may be an optical light emitter, wherein said device is thus an active optical output device, as it generates a visible light signal. Another option is to provide a passive optical output device which comprises an area for depicting the information, wherein said information can be read only if external light strikes this area. For example, said device may be an LCD (liquid crystal display). The described components may be controlled by a chip which also comprises a memory function for the piece of information containing the identification.

The fact that identification devices such as the aforementioned ones can be produced economically makes them all the more attractive. For example, the identification device could be used as a price label on products, or for storing a serial number of products.

SUMMARY

The teachings of the present disclosure may be embodied in an identification device which can be produced in the most economical manner possible and/or a reader via which this identification device may be read and which is also inexpensive for the user to purchase. For example, some embodiments may include a data memory for a piece of information containing the identification, a processor for generating an output signal carrying the piece of information, an optical-to-electrical energy converter which acts as a power supply for the processor, and which converts electromechanical radiation from the surroundings into an electric current I, and which feeds said electric current into the processor via a power connection, and an output device for the piece of information, wherein a data connection is provided between the processor and the output device, for transmitting the output signal a from the processor. In addition, some embodiments may include a reader for the aforementioned identification device comprising a receiving device for the information which is output by the output device.

As another example, some embodiments may include an identification device, comprising: a data memory (12) for a piece of information containing the identification, a processor (11) for generating an output signal a carrying the piece of information, an optical-to-electrical energy converter (14) which acts as a power supply for the processor, and which converts electromagnetic radiation from the surroundings into an electric current I and which feeds said electric current into the processor via a power connection (23), and an output device (13) for the piece of information, wherein a data connection (24) is provided between the processor (11) and the output device (24), for transmitting the output signal a from the processor (11), characterized in that a program is stored in the processor (11), via which an input signal e can be read which is transmitted via the power connection (23) and which is superimposed on the electrical current I.

In some embodiments, the power converter (14) constitutes the sole energy supply for the processor.

In some embodiments, the power converter (14) also supplies power to an energy store (15), as well as to the processor (11), wherein for its part, the energy store supplies the processor (11) and/or the output device (24) with electric power.

In some embodiments, the output device (13) emits an electromagnetic signal, in particular a radio signal or a light signal.

In some embodiments, the processor (11) and the data memory (12) are integrated into a chip, in particular a CMOS chip.

In some embodiments, the energy store (15) comprises a rechargeable thin-layer cell.

In some embodiments, a flexible circuit carrier (22) is provided as the substrate for the implemented circuit.

In some embodiments, said device is furnished with an attachment area, in particular with an adhesive layer (21).

In some embodiments, said device is designed as a placeable component.

In some embodiments, the display device (13) is a passive optical element.

As another example, some embodiments may include a reading device for an identification device as described above, comprising a receiving device (34) for the piece of information which is output by the output device (13), characterized in that an optical transmitting device is provided for the input signal e, wherein the transmitting device transmits an optical power via the input signal e which is sufficient for the power converter (14) to be able to operate the processor (11).

In some embodiments, said device is designed as a communication device, in particular a mobile telephone (30).

In some embodiments, an application program (APP) is installed on said device for operating the identification device.

In some embodiments, the optical transmitting device is formed by a flash (31) which is also available for a camera function.

In some embodiments, the camera function is provided as a receiving device.

In some embodiments, the application program (APP) comprises an interface, in particular a radio interface to an external server (28).

In some embodiments, said program is provided for installation in a reading device according to one of claims 13 to 16.

BRIEF DESCRIPTION OF THE DRAWINGS

Additional details about the teachings of the present disclosure will be described below, based on the drawings. Identical or corresponding drawing elements are respectively provided with the same reference numerals, and are explained multiple times only to the extent that differences arise between the individual figures. The following are shown.

DETAILED DESCRIPTION

Figure 1:
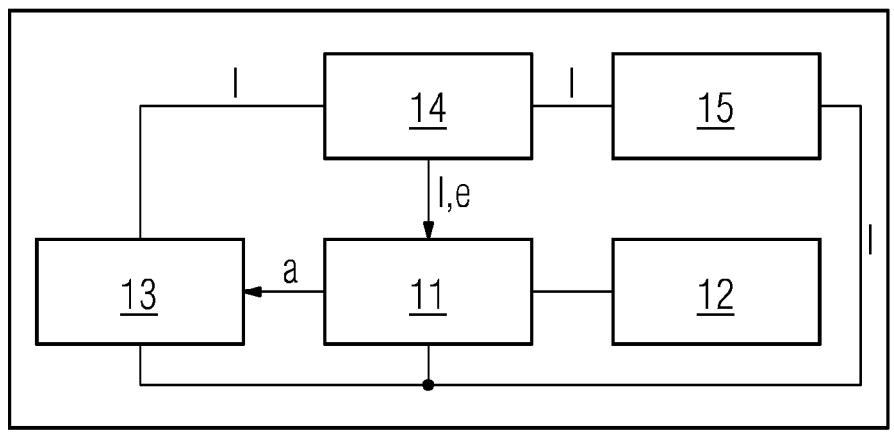
FIG. 1 schematically depicts an exemplary embodiment of the identification device incorporating teachings of the present disclosure, as a block diagram.

In some embodiments, a program is stored in the processor, via which an input signal can be read which is transmitted via the power connection and which is superimposed on the electric current. In other words, this means that the power supply which is autonomously ensured via an optical-to-electrical power converter, for example, a solar cell, may be simultaneously used for transmitting the input signal e. Thus, an optical sensor, which would otherwise have to be provided specifically for activating the processor, is eliminated. Here, use may be made of the fact that after the identification device has been programmed with a piece of information, said device requires only a few input signals during operation. For example, one input signal could be that the piece of information is to be read out, and therefore, the display device is to be activated. Another input signal may be that the identification device is to be activated in the first place if said device was put into a sleep mode due to a power supply which is too low. This could, for example, be the case for a product which was taken from packaging which no light has previously entered.

The functional integration of the optical-to-electrical power converter and an input device for input signals may result in the elimination of a component in the identification device, thus making it more economical to produce. Via the optical-to-electrical power converter, it is possible to generate a current I which is sufficient for supplying power to the display device, and which simultaneously transmits the input signal E. In some embodiments, in the interest of functional integration and production costs which are as low as possible for the identification device, the power converter constitutes the sole power supply for the processor. The display device may also be supplied with current via this power converter. In some embodiments, the power converter also supplies power to an energy store, as well as to the processor, wherein for its part, the energy store supplies the processor and/or the output device with electrical power.

In some embodiments, said energy store is to be a rechargeable energy store which may be economical to produce and which is small in size, because an energy store having an extraordinarily small capacity and of, for example, 100 µWh, is sufficient. In fact, a readout interval requires less than 100 µWh, so that several read operations can be carried out, during which in any case, new energy continues to be provided via the input signal for activating the processor. In some embodiments, the energy store contributes to the processor being immediately ready for operation when the piece of information is to be read out, and does not have to be initially supplied with enough power via the optical-to-electrical power converter to ensure the functioning of the processor. The energy store may, for example, be formed via a rechargeable thin-layer cell.

In some embodiments, the output device emits an electromagnetic signal, in particular a radio signal or a light signal. The output device may comprise a converter, for example, an antenna, a light-emitting diode, or a luminous two-dimensional display with pixels, e.g., a display screen. Various standards can be used for displaying, in order to enable a readout and, for example, to operate a Bluetooth interface or an infrared interface in the reader. In this case, due to the limited available energy, the strength of the signal may also be far lower than required in relevant standards, since a readout requires only a brief period and can be carried out in that the reader is brought very close to the identification device.

In some embodiments, the processor and the data memory are integrated into a chip, in particular a CMOS (complementary metal-oxide-semiconductor) chip. As a result, additional functional integration may be achieved in an economical chip component, in which in addition, the processor is able to access the data stored in the data memory quickly.

In some embodiments, the substrate for the implemented circuit is a flexible circuit carrier. The circuit is made up of the components already specified above, e.g., a data memory, a processor (it being possible to implement these two functions via a single chip), the power supply, the output device, and possibly the energy store. A flexible circuit carrier may be adapted to the surface of a product, if, for example, said surface is curved. In addition, an attachment area may be furnished with an adhesive layer, wherein an identification device may then very easily be applied by affixing it to the product which is to be identified. In some embodiments, the attachment area itself may also be furnished with an adhesive, so that the identification device adheres to the product by itself.

In some embodiments, the identification device comprises a placeable component. In this way, in particular electronic products can be identified in a very economical manner, since the component can be incorporated into a placing process for the electronics installation. It is not necessary for the identification device to be supplied with electric power at the installation site, since said device functions autonomously. However, such an electric power supply may also be provided, so that the electronic device can be read out more quickly during operation. However, reading out is also possible, for example, in new condition, if a power supply of the electronic device is not yet activated.

In some embodiments, the display device is a passive optical element. Said element may, for example, be an LCD. The piece of information is depicted on the LCD and is recorded either via a reading device or directly by the human eye. In some embodiments, the recording takes place without a reading device, by reading the piece of information from the display device.

In some embodiments, an optical transmitting device is provided for the input signal, and the transmitting device transmits an optical power via the input signal which is sufficient for the power converter to be able to operate the processor. Thus, the reading device is equipped in such a way that reading out the identification device is made possible without other power sources. The costs associated with the power supply are thus incurred only during the production of the reading device, but not during the production of the identification devices, which are to be used in large numbers, whereas comparatively fewer reading devices are used.

In some embodiments, the reading device comprises a communication device, in particular a mobile telephone. This means that a device which is in circulation in large numbers may be used as a reading device. In particular, the communication devices of end users may be updated in order to be used as a reading device, as described below in greater detail.

In some embodiments, the device comprises an application program, an "app", on the communication device, which uses the infrastructure of the communication device. For example, a flash which is also available for a camera function of the communication device may be used as an optical transmitting device. Such a camera function has become standard, for example, on smartphones. This camera function may in particular also be provided as a receiving device via which is it then possible to read a passive optical element. Here as well, the flash may be used productively.

Some embodiments comprise an application program which is provided for operating the identification device, and for this purpose, is installed on a reading device, in particular, a mobile telephone, which is also to be understood to mean a smartphone.

FIG. 1 depicts a display device as a block diagram. Said device comprises a processor 11 which controls the processes in the identification device. Said processes include reading a data memory 12 in which the piece of information is stored which is required for the identification, for example of a product, for example, a serial number or equipment features. This information may be relayed to a display device 13 in the form of an output signal a.

The processor 11 is supplied via a current I which simultaneously contains an input signal for activating the processor 11. This takes place via an optical-to-electrical power converter 14 in the form of a solar cell. In addition, the power converter 14 may supply an energy store 15 in the form of a thin-layer cell which is rechargeable, with a current I. In addition, the display device 13 may be supplied with a current I. If the energy store 15 is at least partially full, it may also supply the processor 11 and the display device 13 with a current I.

Figure 2:
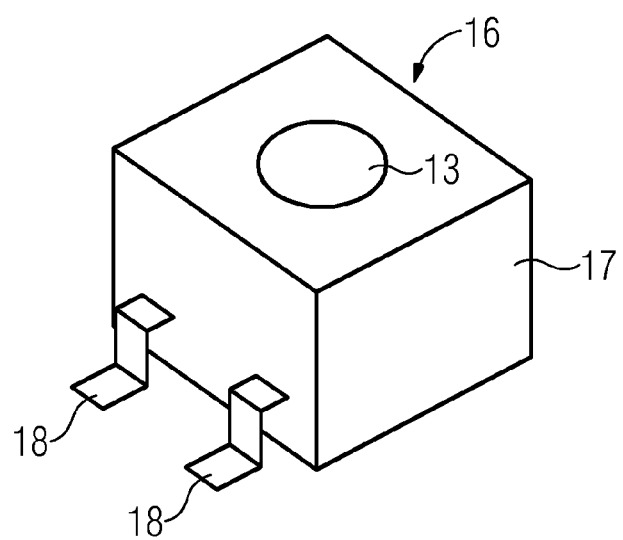
FIG. 2 shows a three-dimensional depiction of another exemplary embodiment of the identification device incorporating teachings of the present disclosure, as a component.

FIG. 2 shows an identification device 16 which has the form of a component. Here, a housing 17 may be a standardized housing as used for components in electronics production. Here, the display device 13 is implemented as a light-emitting diode. Optionally, the identification device 16 may also comprise electrical contact structures 18 via which an external electrical supply, for example, from an electronic product, may take place. However, the identification device also functions via an autonomous power supply as was described for FIG. 1 and which is implemented in the identification device according to FIG. 2 in a manner which is not depicted.

Figure 3:
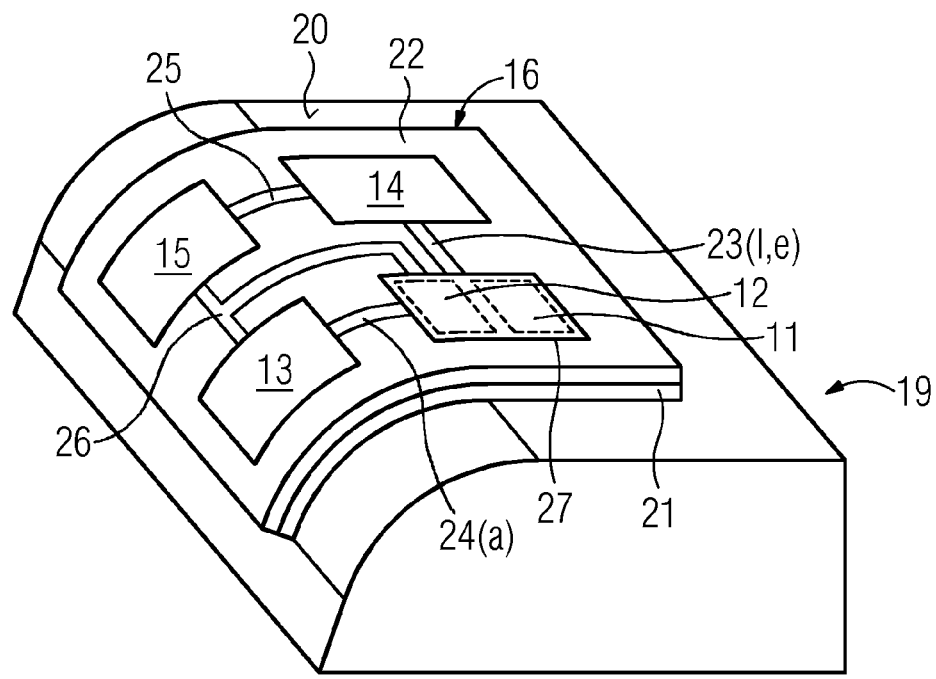
FIG. 3 shows a three-dimensional depiction of an exemplary embodiment of the identification device incorporating teachings of the present disclosure, as a flexible circuit carrier.

FIG. 3 shows a product 19 having a curved surface 20. The identification device 16 is affixed to this product via an adhesive layer 21, said device being attached to a flexible circuit carrier 22.

The power converter 14 is connected to the processor 11 via a power connection 23 which is able to transmit a current I and the input signal e. In addition, the processor 11 comprises a data connection 24 via which an output signal a comprising the piece of information to be displayed may be transmitted to the display device 13 in the form of a flexible LCD. In addition, the energy store 15 is connected to the power converter 14 via a current connection 25, wherein the energy store comprises supply connections 26 to the processor 11 and the display device 13. The power connection 23, the data connection 24, the current connection 25, and the supply connection 26 are implemented on the flexible circuit carrier 22 as conducting paths. Other lines (for example, return connections to a ground potential) may be provided on the rear side of the circuit carrier (not depicted).

In FIG. 3, the processor 11 is depicted by dashed lines, in the same manner as the data memory 12, because these two functionalities are implemented in a single chip 27. Finally, it is also the chip, the one having the line connection 23, which is electrically contacted by the data connection 24 and the supply connection 26.

Figure 4:
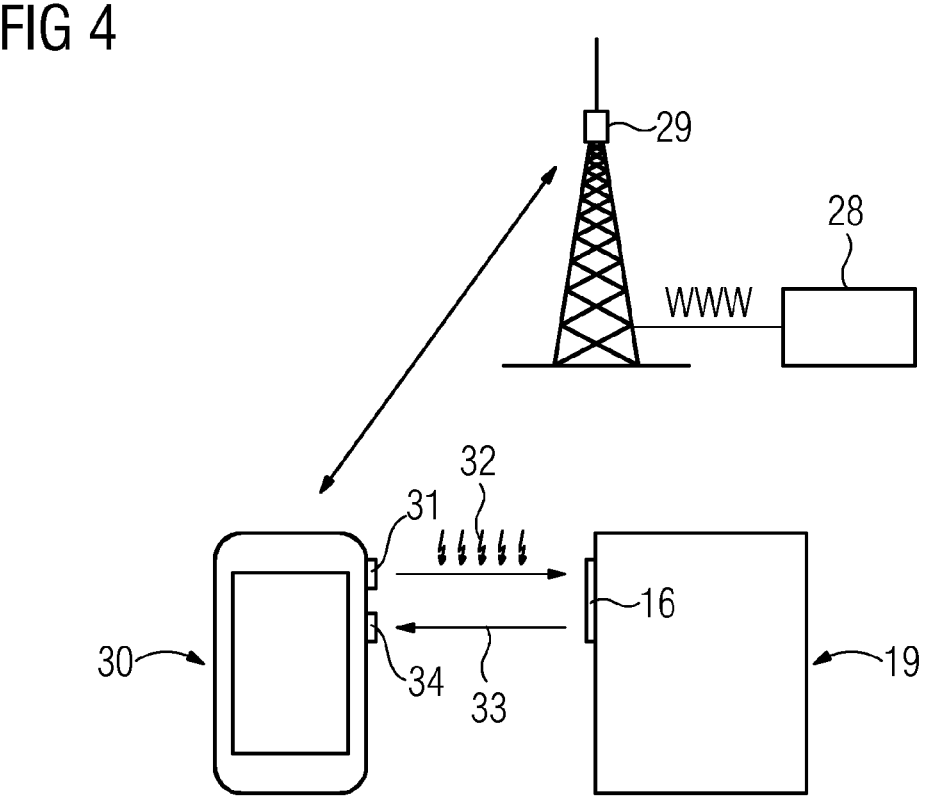
FIG. 4 shows an exemplary embodiment which depicts the interaction of the identification device incorporating teachings of the present disclosure with an exemplary embodiment of the reading device incorporating teachings of the present disclosure.

FIG. 4 depicts how the display device 16 may be used on the product 19. If the customer has bought and unpacked the product 19, said customer may download an app via a server 28 from the Internet (www) to said customer's mobile telephone (smartphone), via a transmitting station 29. This app updates the customer's smartphone for communicating with the identification device 16. For this purpose, a flash 31 is activated via which a sequence of flashes 32 is transmitted to the electrical-to-optical converter of the identification device 16, which is not depicted in greater detail. The energy content of the sequence of flashes 32 is sufficient to activate the identification device 16 and in addition, contains encoding for an input signal which is processed by the non-depicted processor. Said processor then activates a passive output device (not depicted), which transmits an optical signal 33 to the receiving device 34 in the form of the camera function of the mobile telephone 30.

The server 28 may provide additional services to the customer. For example, the purchase date could be contained in the signal 33, so that the server can check necessary maintenance intervals. A serial number may also be contained in the signal 33 which, for example, may be used when requesting replacement parts or when automatically registering the product via the app. The ordering of accessories in an Internet shop provided by the server 28 could also be supported. Other application examples are also conceivable.

What is claimed is:

1. An identification device comprising:
   a data memory storing a piece of information containing an identification;
   a processor generating a signal indicating the piece of information;
   an optical-to-electrical energy converter receiving an optical signal from a photographic camera flash and supplying power for the processor by converting electromagnetic radiation from the camera flash into an electric current feeding the processor via a power connection;
   an output device with a data connection to the processor for transmitting the signal;

a carrier for the data memory, the processor, the energy converter, and the output device, wherein the substrate comprises a flexible substrate configured to attach to a curved surface; and an executable program stored in the processor for reading an input signal transmitted via the power connection and superimposed on the electrical current.

2. The identification device as claimed in claim 1, wherein the power converter constitutes a sole energy supply for the processor.

3. The identification device as claimed in claim 1, wherein the power converter supplies power to an energy store and to the processor; and the energy store supplies electric power to the processor and/or the output device.

4. The identification device as claimed in claim 1, wherein the output device emits an electromagnetic signal.

5. The identification device as claimed in claim 1, wherein the processor and the data memory are integrated into a chip.

6. The identification device as claimed in claim 1, further comprising an energy store including a rechargeable thin-layer cell.

7. The identification device as claimed in claim 1, further comprising an attachment area with an adhesive layer.

8. The identification device as claimed in claim 1, wherein the device comprises a placeable component.

9. The identification device as claimed in claim 1, wherein the display device comprises a passive optical element.

* * * * *